(12) United States Patent
Zimmel et al.

(10) Patent No.: US 6,827,632 B2
(45) Date of Patent: Dec. 7, 2004

(54) METHOD FOR POLISHING A FIBER OPTIC ATTENUATOR FERRULE

(75) Inventors: Steven C. Zimmel, Minneapolis, MN (US); William J. Pomroy, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/208,733

(22) Filed: Jul. 31, 2002

(65) Prior Publication Data

US 2004/0023598 A1 Feb. 5, 2004

(51) Int. Cl.[7] .................................................. B24B 1/00
(52) U.S. Cl. ........................................ 451/41; 451/28
(58) Field of Search ............................ 451/41, 28, 364; 386/59, 60, 53, 72

(56) References Cited

U.S. PATENT DOCUMENTS

| | | | |
|---|---|---|---|
| 4,649,670 A | | 3/1987 | Snyder |
| 5,018,316 A | * | 5/1991 | Mulholland et al. ........ 451/364 |
| 5,480,344 A | | 1/1996 | Xu et al. |
| 5,813,081 A | * | 9/1998 | Wang et al. ................ 15/210.1 |
| 5,883,995 A | * | 3/1999 | Lu .............................. 385/60 |
| 5,947,797 A | | 9/1999 | Buzzetti |
| 5,984,531 A | | 11/1999 | Lu |
| 6,076,973 A | | 6/2000 | Lu |
| 6,183,343 B1 | | 2/2001 | Buzzetti |
| 6,190,239 B1 | | 2/2001 | Buzzetti |
| 6,220,763 B1 | * | 4/2001 | Stephenson .................. 385/73 |
| 6,296,398 B1 | | 10/2001 | Lu |
| 6,461,055 B1 | * | 10/2002 | Zimmel ........................ 385/73 |
| 6,547,653 B2 | * | 4/2003 | Yamada et al. ............. 451/364 |

OTHER PUBLICATIONS

"Fiber Optic. Cable Assemblies and Accessories," *ADC Telecommunications, Inc.*, pp. 1–23 (Apr. 2003).
"LX.5® Small–Factor–Connector," *ADC Telecommunications, Inc.*, pp. 2–3 (Sep. 2001).

* cited by examiner

*Primary Examiner*—Lee D. Wilson
(74) *Attorney, Agent, or Firm*—Merchant & Gould P.C.

(57) ABSTRACT

A method for polishing a ferrule structure having first and second end faces is disclosed herein. The method includes positioning the ferrule structure within a housing such that the first end face is located outside the housing. The method also includes polishing the first end face while the ferrule structure is positioned within the housing and the first end face is located outside the housing. The method further includes reversing the ferrule structure within the housing such that the second end face is located outside the housing, and polishing the second end face while the ferrule structure is positioned within the housing and the second end face is located outside the housing.

23 Claims, 10 Drawing Sheets

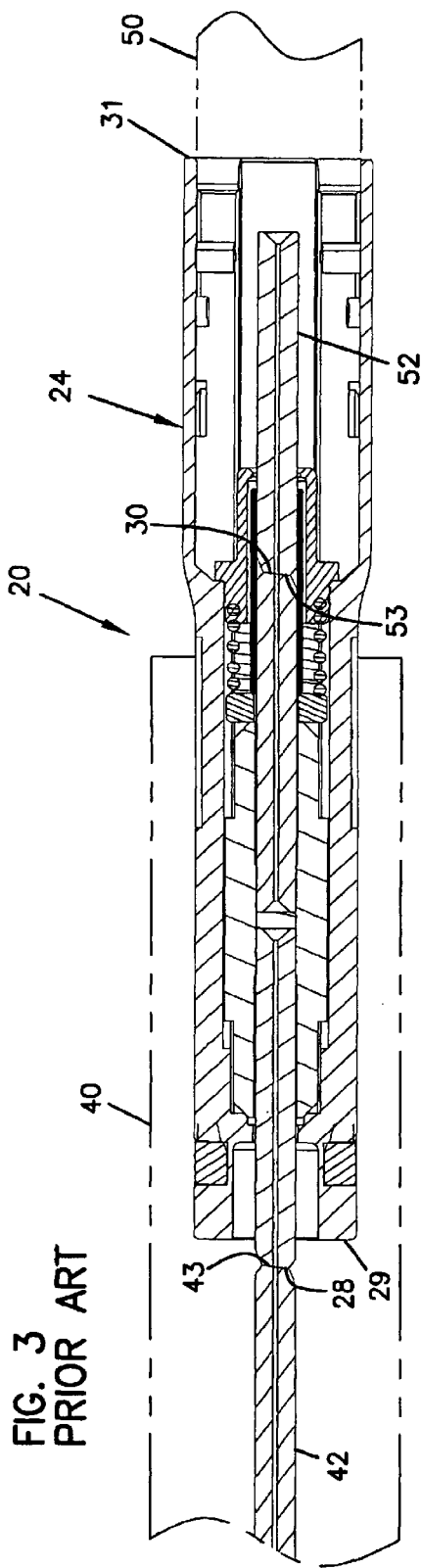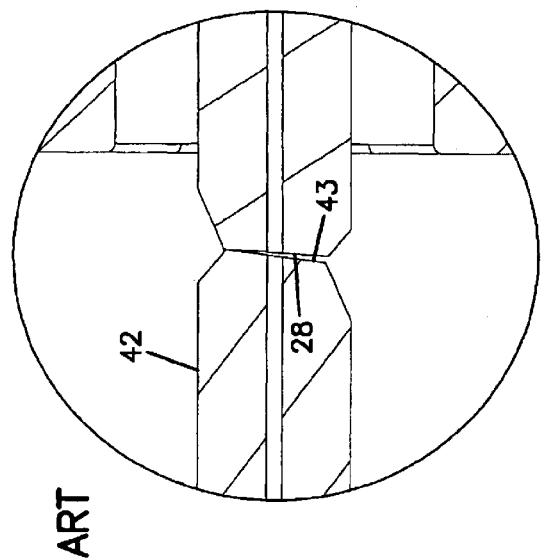
FIG. 3
PRIOR ART
FIG. 4
PRIOR ART

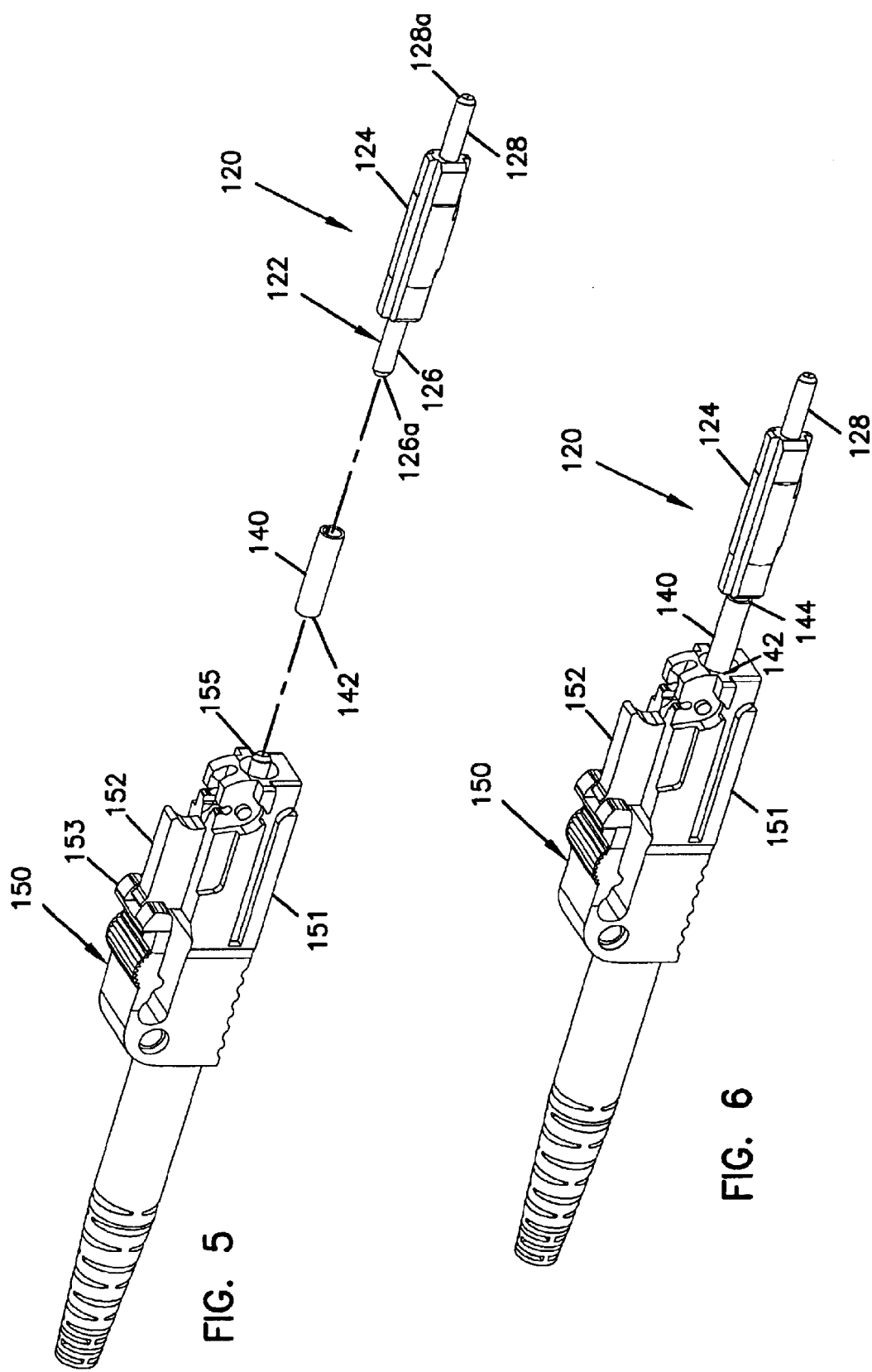

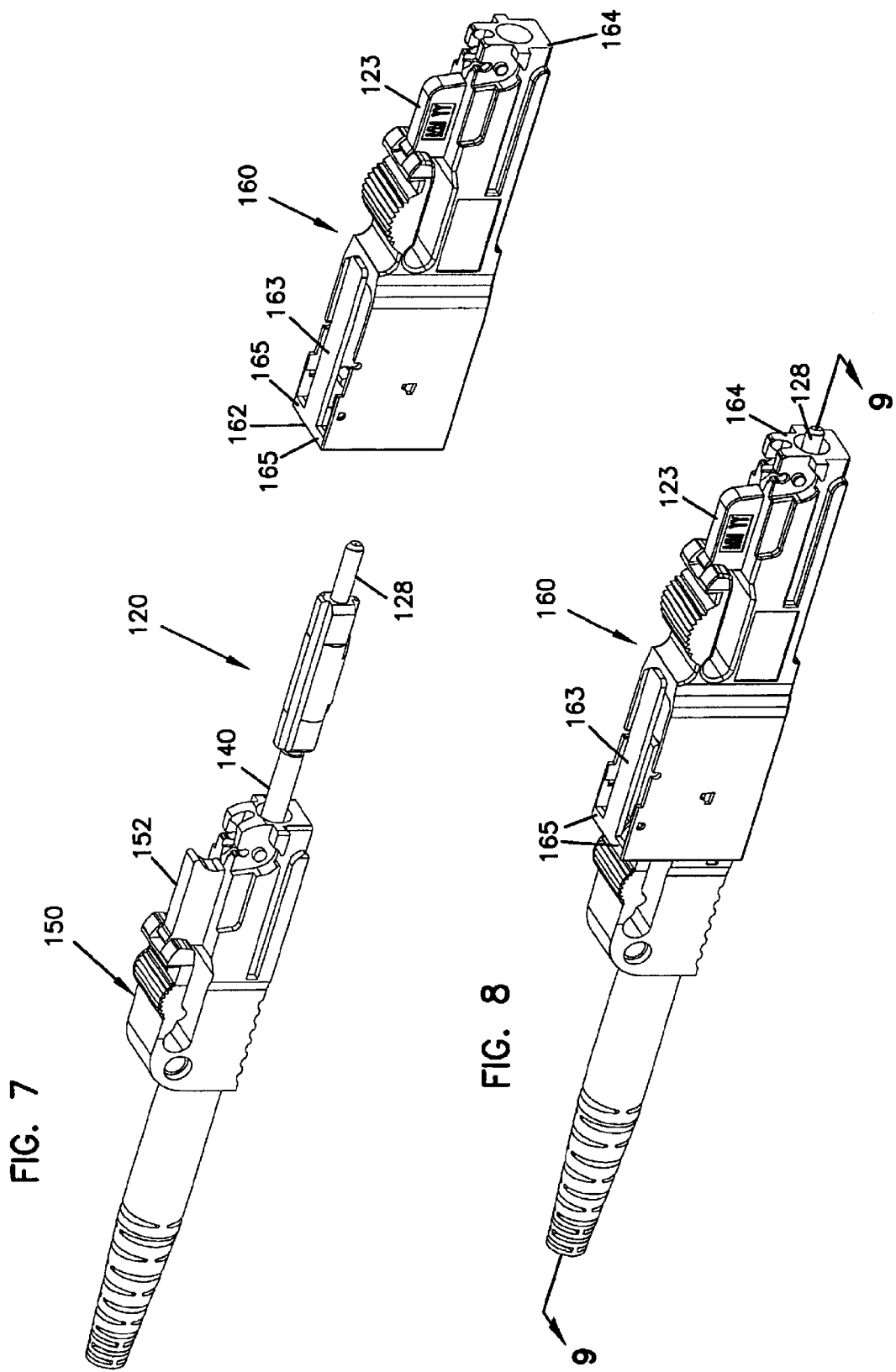

FIG. 11
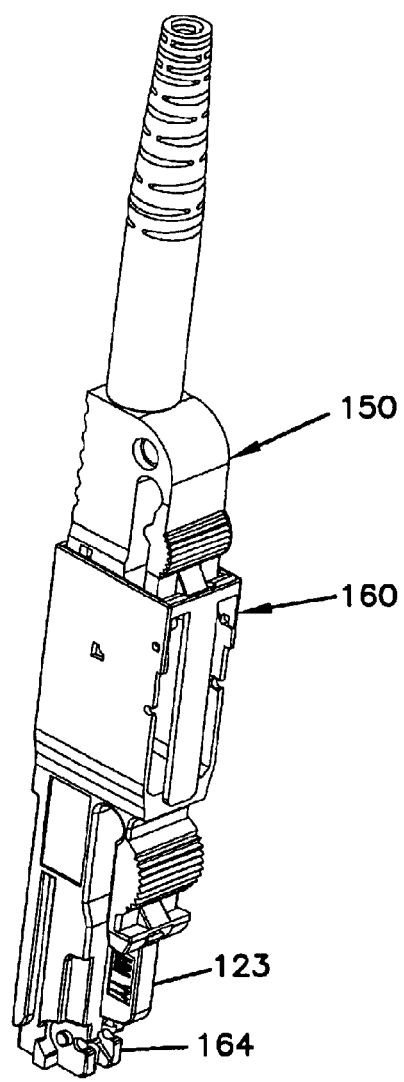
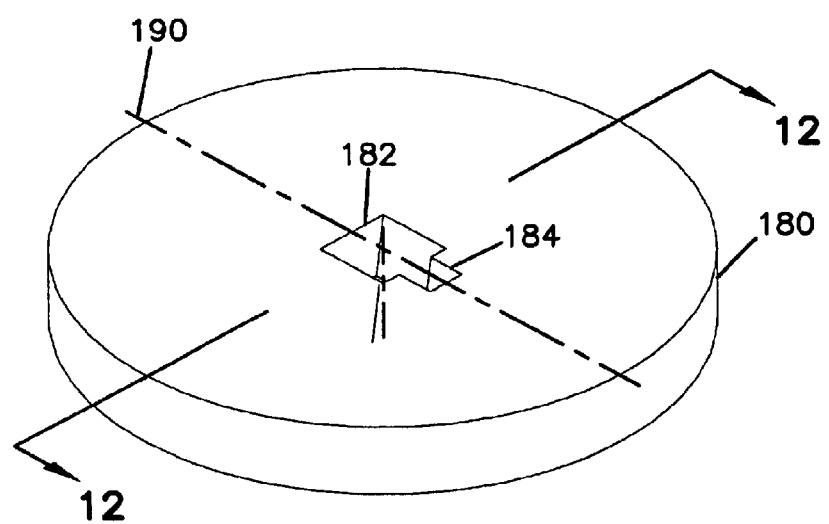

METHOD FOR POLISHING A FIBER OPTIC ATTENUATOR FERRULE

FIELD OF THE INVENTION

The present invention relates generally to methods for manufacturing and polishing fiber optic components. More particularly, the present invention relates to methods for polishing fiber optic attenuator ferrules.

BACKGROUND OF THE INVENTION

Fiber optic attenuators are optical components that induce a calibrated loss between two connectors to dampen (i.e., attenuate) an optical signal. Attenuation is desirable if the optical signal has a power level that exceeds the operating range of the equipment to which the signal is being transferred. Excessive signal power can cause saturation at the receiver and induce system errors and failures. Attenuation is typically achieved by passing the signal through an absorption filter or an air gap. Conventional fiber optic attenuators are available in bulkhead, in-line and build-out configurations.

FIGS. 1 and 2 illustrate a prior art in-line attenuator 20. The attenuator 20 includes a ferrule assembly 22 mounted within a housing 24. The ferrule assembly 22 includes a ferrule structure 26 having a first end face 28 accessible from a first end 29 of the housing 24, and a second end face 30 accessible from a second end 31 of the housing 24. The ferrule assembly 22 also includes a hub 32 located at a mid-region of the ferrule structure 26. The hub 32 nests within a hub receiver 33 defined by the housing 24. An attenuating structure (e.g., an absorption filter or air gap) is located within the ferrule structure 26.

FIG. 3 shows the attenuator 20 providing an optical coupling between first and second fiber optic connectors 40 and 50. In FIG. 3, a cover 61 (shown in FIG. 1) at the first end 29 of the housing 24 has been pivoted open to expose the first end face 28. The first connector 40 is inserted over the first end 29 of the housing 24, and the second connector 50 is inserted within the second end 31 of the housing 24. The first connector 40 includes a ferrule 42 having an end face 43 that abuts against the end face 28 of the ferrule structure 26 when the connector 40 is coupled to the attenuator housing 24. The second connector 50 includes a ferrule 52 having an end face 53 that abuts against the end face 30 of the ferrule structure 26 when the connector 50 is coupled to the attenuator housing 24. In use, optical signals are transferred between the connectors 40, 50 by passing through the ferrule assembly 22. As the signals pass through the ferrule assembly 22, the desired attenuation is provided.

To improve performance parameters such as insertion loss and return loss, it is desirable to polish the end faces 28, 30 of the ferrule structure 26. It is preferred for the end faces 28, 30 to be polished at a slight angle (e.g., about 8 degrees relative to a plane perpendicular to a longitudinal axis of the ferrule). To ensure acceptable performance levels, it is preferred for the angled end faces 28, 30 of the ferrule/hub assembly 22 to abut angled end faces 43, 53 of the connector ferrules 42, 52 in a generally parallel relationship as shown in FIG. 3. Slight deviations in the relative orientations of the end faces can result in air gaps between the end faces 28, 43 and 30, 53 (see FIG. 4 where misalignment is shown between the end faces 28 and 43). This type of misalignment can be detrimental to the optical performance of the coupling.

In the prior art, the end faces 28 and 30 of the ferrule structure 26 are typically polished prior to mounting the ferrule assembly 22 in the housing 24. One reason for this practice is because the end face 30 of the ferrule structure 26 is not accessible for polishing once the ferrule structure 26 has been mounted within the attenuator housing 24. However, it has been determined that when the ferrule assembly 22 is mounted within the housing 24 after the end faces 28, 30 have already been polished, part tolerances mismatches can cause the end faces 28, 30 to be slightly rotationally offset from their intended rotational orientations. With the end faces 28, 30 rotationally offset from their intended orientations, the end faces 28, 30 may not make parallel contact with the connector end faces 43, 53 when the connectors 40, 50 are coupled to the attenuator 20. As indicated above, this type of misalignment can be detrimental to the optical performance of the coupling.

SUMMARY

The present disclosure relates to methods for ensuring the proper rotational alignment of a ferrule within a housing. It will be appreciated that the specific method steps disclosed herein are examples of one way the broad concepts of the present invention may be put into practice, and that variations can be made with respect to the described method steps without departing from the broad scope of the inventive concept.

BRIEF DESCRIPTION OF THE DRAWINGS

The accompanying drawings, which are incorporated in and constitute a part of the specification, illustrate various method steps that are examples of how certain inventions can be put into practice. A brief description of the drawings is as follows:

FIG. 3 shows the ferrule of the attenuator of FIG. 1 coupled to connectors which are schematically depicted;

FIG. 4 illustrates an interface mismatch between the end faces of two ferrules;

FIG. 5 is an exploded view showing a split sleeve positioned between a fiber optic connecter and a ferrule assembly;

FIG. 6 shows the connector and ferrule assembly of FIG. 5 coupled together by the split sleeve;

FIG. 7 shows the coupled connector and ferrule assembly of FIG. 6 positioned in alignment with an in-line attenuator housing;

FIG. 8 shows the coupled connector and ferrule assembly of FIG. 7 inserted within the attenuator housing;

FIG. 11 shows the assembly of FIG. 8 prior to insertion in a polishing fixture;

DETAILED DESCRIPTION

The present disclosure is directed toward methods for ensuring the proper rotational alignment of a ferrule within a housing. The methods disclosed herein are directed specifically toward an in-line attenuator having a ferrule structure with two end faces, only one of which is typically accessible for polishing while the ferrule structure is mounted within the attenuator housing. However, it will be appreciated that the broad inventive concepts of the present disclosure are not limited only to attenuators, but instead are applicable to any type of fiber optic device where it is desirable to mount a ferrule at a particular rotational alignment with respect to a housing. As used herein the term "ferrule structure" means a structure including one or more ferrules.

Figure 9:
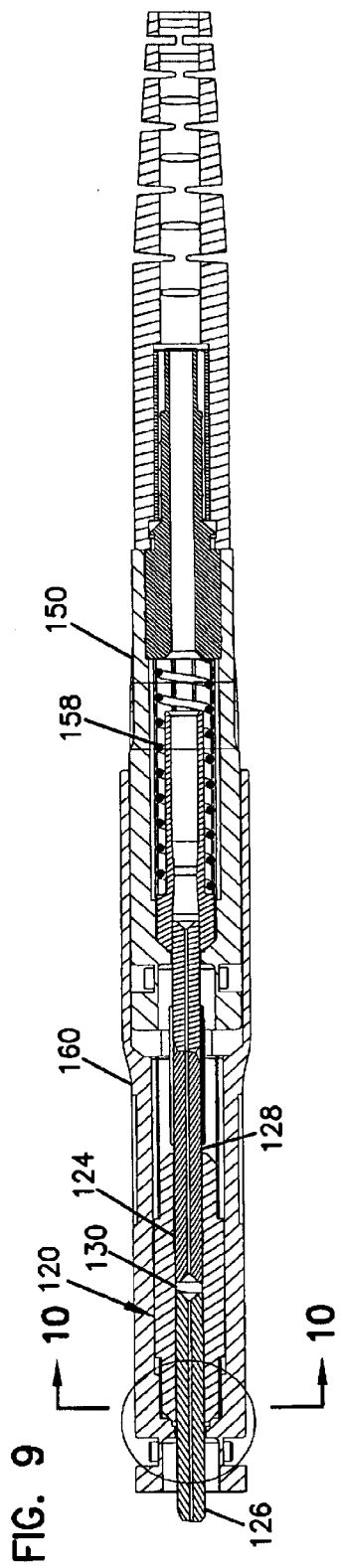
FIG. 9 is a cross-sectional view taken along section line 9—9 of FIG. 8.

FIG. 5 shows an attenuator ferrule assembly 120 desired to be polished. The assembly 120 includes a ferrule structure 122 and a hub 124. The hub 124 is mounted at a mid-region of the ferrule structure 122. The ferrule structure 122 includes first and second end portions 126 and 128. As shown in FIG. 9, an attenuation structure 130 is located within the hub 124 between the first and second end portions 126, 128 of the ferrule structure 122. The first end portion 126 of the ferrule structure 122 includes an end face 126a and the second end portion 128 of the ferrule structure 122 includes an end face 128a.

Referring again to FIG. 5, the ferrule assembly 120 is shown in coaxial alignment with a split sleeve 140 and a connector 150. The connector 150 includes a housing 151 having rotational alignment key 152 and a resilient latch 153. The connector 150 also includes a ferrule 155 that projects outwardly from the housing 151.

The split sleeve 140 is preferably made of a resilient material such as zirconia or phosphorous bronze that allows the split sleeve 140 to be elastically flexed from a reduced diameter configuration to an enlarged diameter configuration. The resilient nature of the split sleeve 140 allows a first end 142 to be pressed over the ferrule 155 of the connector 150 as shown in FIG. 6. Similarly, a second end 144 of the split sleeve 140 can be inserted over the first end portion 126 of the ferrule structure 122. The split sleeve 140 functions to mechanically couple the ferrule assembly 120 to the connector 150, and also functions to hold the ferrule structure 122 in coaxial alignment with the ferrule 155 of the connector 150.

After the ferrule assembly 120 has been secured to the connector 150 by the split sleeve 140, the connector 150, the split sleeve 140 and the ferrule assembly 120 are all inserted into a first end 162 of an attenuator housing 160 (see FIGS. 7 and 8). The attenuator housing 160 includes a keyway 163 that receives the key 152 of the connector 150, and shoulders 165 that interlock with the resilient latch 153 to provide a snap fit connection for holding the connector 150 within the attenuator housing 160. Preferably, the assembly is pushed into the attenuator housing 160 until the latch 153 snaps into a locked position as shown in FIG. 8. With the connector 150 locked in place, the second end portion 128 of the ferrule structure 122 projects outwardly from a second end 164 of the attenuator housing 160 (see FIG. 8).

Figure 9A:
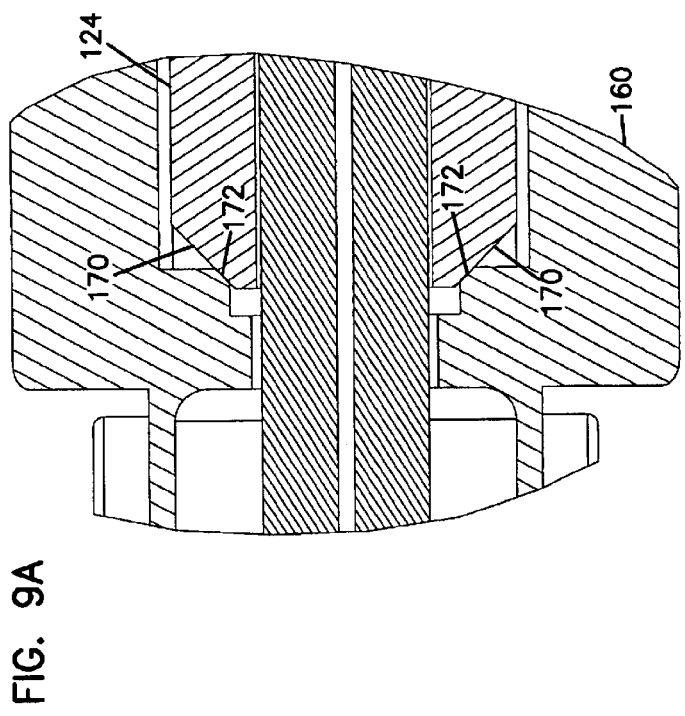
FIG. 9A is a detail view of a portion of FIG. 9.
Figure 10A:
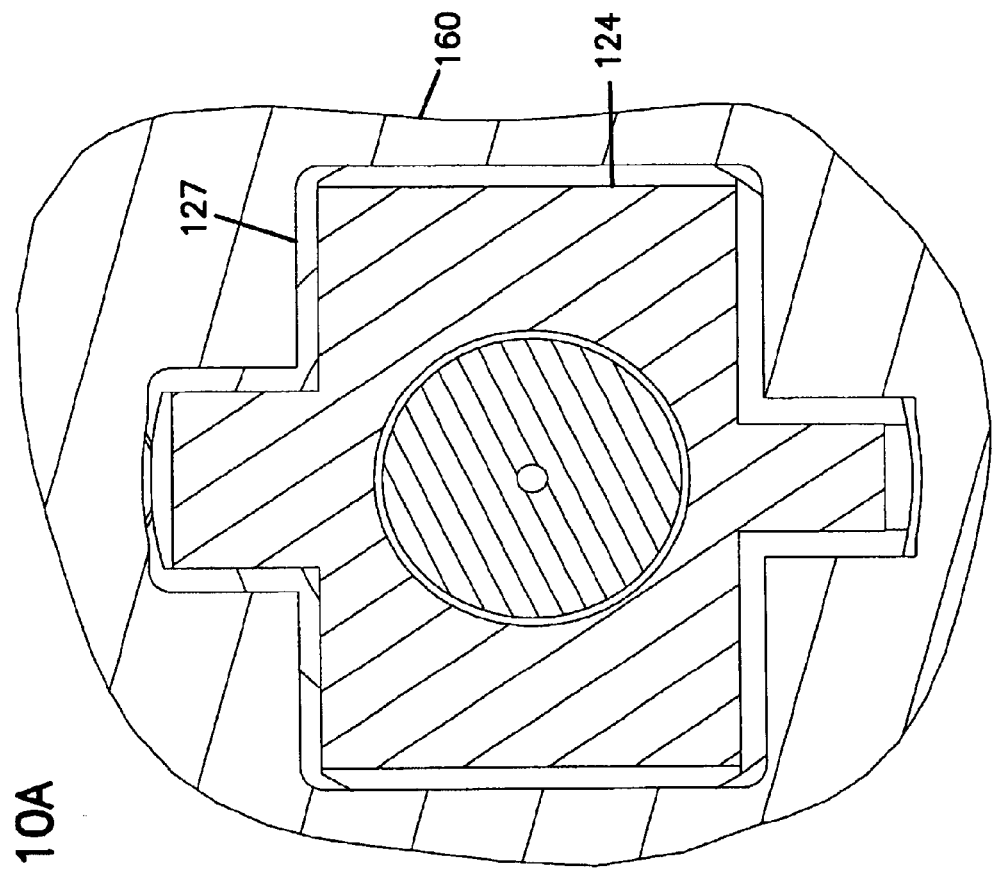
FIG. 10A is a detail view of a portion of FIG. 10.
Figure 10:
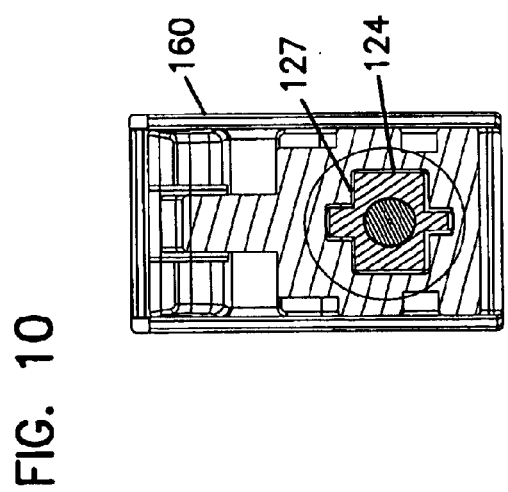
FIG. 10 is a cross-sectional view taken along section line 10—10 of FIG. 9.

Referring to FIG. 9, the hub 124 of the ferrule assembly 120 preferably nests within the attenuator housing 160 such that the ferrule assembly 120 is positioned at a particular rotational orientation relative to a rotational alignment key 123 (shown in FIGS. 7 and 8) of the attenuator housing 160. For example, as shown in FIGS. 10 and 10A, the hub 124 has a generally "plus" or "cross" shaped transverse cross-section that preferably fits within a complementary opening 127 defined within the attenuator housing 160. Additionally, as shown in FIG. 9A, the hub 124 has an end face including angled or ramped surfaces 170 that engage corresponding ramp surfaces 172 defined within the attenuator housing 160. Contact between the surfaces 170 and 172 prevents relative rotation between the ferrule assembly 120 and the attenuator housing 160, and also ensures that the ferrule assembly 120 is aligned at a particular rotational alignment relative to the attenuator housing 160. The ramped surfaces 170 are biased against the ramped surfaces 172 by a spring load provided by spring 158 of the connector 150. The spring load provided the spring 158 ensures that the angled surfaces 170 seat firmly against the angled surfaces 172 of the attenuator housing 160.

The matching "plus" shape of the hub 124 and the opening 127 of the attenuator housing 160 ensures that the ferrule/hub assembly 120 is inserted at approximately the proper rotational alignment relative to the attenuator housing 160. The exact rotational alignment between the ferrule/hub assembly 120 and the housing 160 is provided by contact between the ramped surfaces 170 and 172. While one particular configuration for ensuring rotational alignment between the ferrule/hub assembly 120 and the attenuator housing 160 has been shown, it will be appreciated that any number of different types of configurations could be used, and that the broad inventive concepts of the present disclosure are not limited to the particular alignment configuration depicted herein.

After the connector 150 has been secured within the attenuator housing 160 as shown in FIGS. 8 and 9, the attenuator housing 160 is mounted within a polishing fixture 180 (see FIG. 11). Alternatively, the attenuator housing 160 can be mounted in the fixture 180 prior at receiving the connector 150. The polishing fixture 180 defines an opening 182 having a shape that complements an outer shape of the second end 164 of the attenuator housing 160. For example, the opening 182 includes a keyway 184 that receives the rotational alignment key 123 of the attenuator housing 160. The keyway 184 ensures that the attenuator housing 160 is inserted into the opening 182 in a predetermined rotational orientation.

Figure 12:
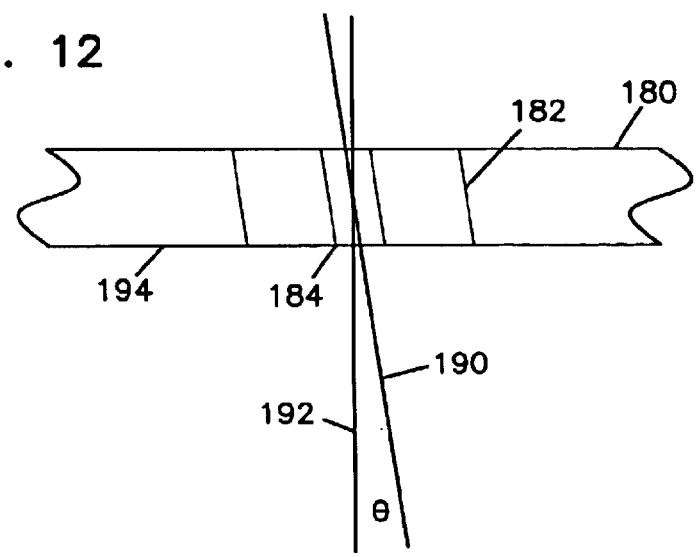
FIG. 12 is a cross-sectional view taken along section line 12—12 of FIG. 11.

In FIGS. 11 and 12, the opening 182 of the fixture 180 is shown bisected by a first reference plane 190. As best shown in FIG. 12, the opening 182 is skewed within the fixture 180 such that the first reference plane 190 is aligned at an angle θ relative to a second reference plane 192. The second reference plane 192 is perpendicular to a bottom surface 194 of the polishing fixture 180. In a preferred embodiment, the angle θ is 8 degrees. In alternative embodiments, other angles such as 9 degrees, 10 degrees or other angles could also be used.

Figure 13:
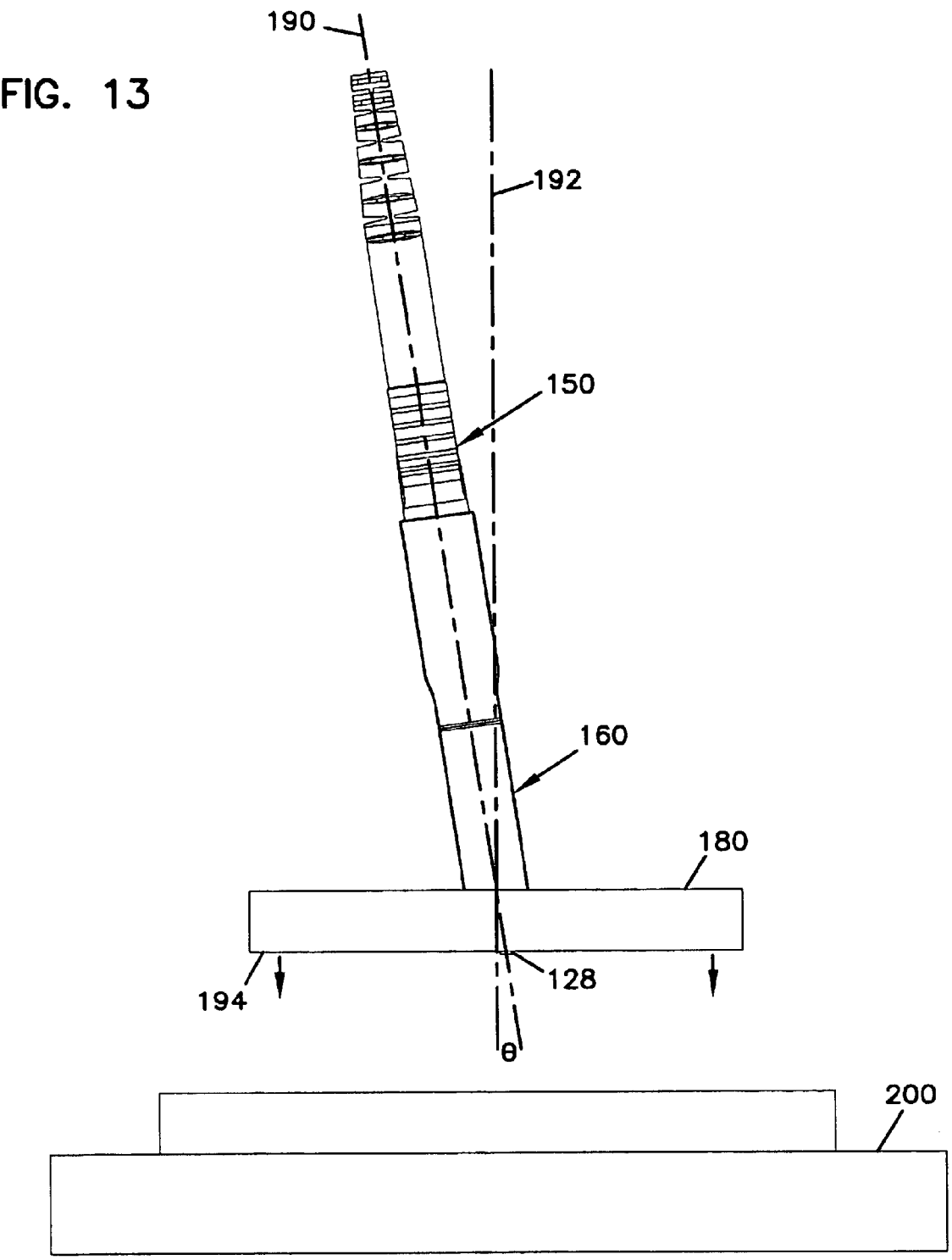
FIG. 13 shows the assembly of FIGS. 8 and 11 after insertion in the polishing fixture.

FIG. 13 shows the attenuator housing 160 fully inserted in the polishing fixture 180. As so mounted, the skew of the opening 182 causes the attenuator housing 160 and its corresponding ferrule structure 122 to be skewed at the angle θ relative to the second reference plane 192. A tip of the ferrule end 128 preferably projects beyond the bottom surface 194 of the polishing fixture. The polishing fixture 180 can also include a clamping mechanism for clamping the ferrule end 128 within the fixture 180 after the attenuator housing 160 has been inserted within the opening 182.

After the attenuator housing 160 has been mounted in the fixture 180, the end face 128 of the ferrule structure 122 is polished. For example, the fixture 180 can be lowered toward a rotating or oscillating polishing mechanism 200. The polishing mechanism can include a polishing film such as aluminum oxide, silicon carbide, diamond polishing film, etc. Additionally, cushioning pads can be positioned between the polishing film and the drive mechanism. In other embodiments, the fixture 180 can be moved while the polishing film remains stationary. It will be appreciated that any number of conventional polishing techniques can be used for polishing the tip of the ferrule structure 122.

Figure 14:
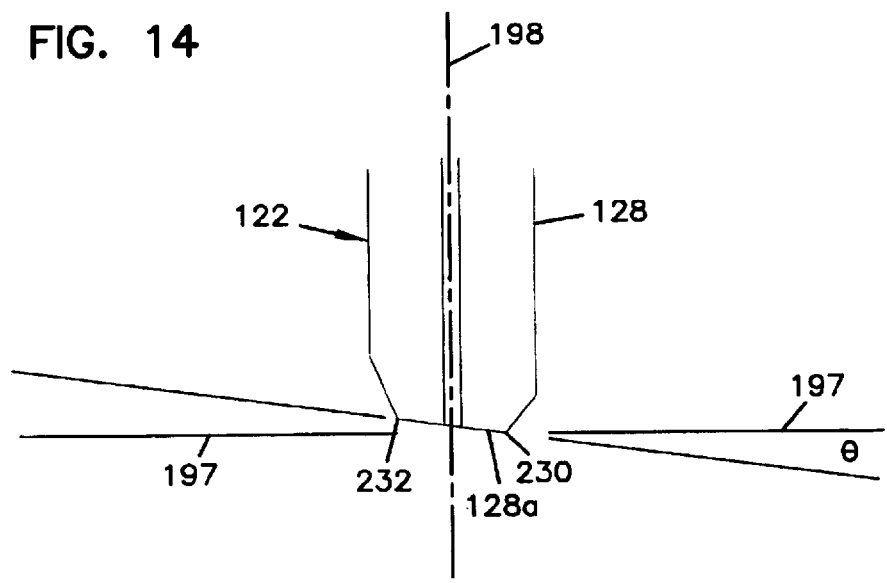
FIG. 14 shows a ferrule end of the assembly of FIG. 8 after polishing.
Figure 15:
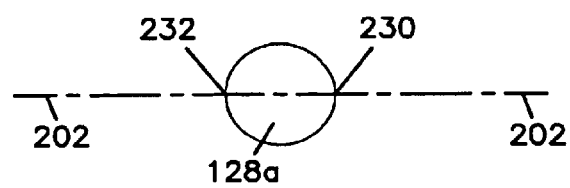
FIG. 15 is an end view of the ferrule end of FIG. 14.

Once the polishing process has been completed, the end face 128a of the ferrule structure 122 is preferably aligned parallel with the bottom surface 194 of the fixture and thus perpendicular with respect to the second reference plane 192. In some embodiments, the end face 128a is flush with the bottom surface 194. Referring to FIG. 14, the end face 128a is aligned at the angle θ relative to a plane 197 oriented perpendicular to a central axis 198 of the ferrule structure 122. Because the end face 128a is polished at an angle, the end face 128a has an elliptical configuration after polishing as shown in FIG. 15. Referring to FIGS. 14 and 15, the elliptical configuration of the end face 128a defines a major axis 202, and outermost and innermost apexes 230, 232.

In the depicted embodiment, the fixture 180 was shown including only one opening 182. It will be appreciated that in a preferred embodiment, the fixture includes multiple openings for allowing a plurality of ferrules to be polished simultaneously.

After the end face 128a of the ferrule structure 122 has been polished, the attenuator housing 160 can be removed from the opening 180 in the fixture, and the connector 150 can be disconnected from the attenuator housing 160. Thereafter, the first end portion 126 of the ferrule structure 122 is pulled from the split sleeve 140 and the ferrule assembly 120 is reversed. To reverse the ferrule assembly 120, the assembly 120 is rotated 180 degrees and the previously polished end portion 128 of the ferrule structure 122 is inserted into the split sleeve 140 mounted on the connector 150. The connector is then inserted into and locked within the first end 162 of the attenuator housing 160. As so positioned, the first end portion 126 of the ferrule structure 122 projects beyond the second end 164 of the attenuator housing 160. Subsequently, the attenuator housing 160 can be reinserted into the polishing fixture 180, and the end face 126a of the ferrule structure 122 can be polished in the same manner previously described with respect to the end face 128a. The end of the hub 124 positioned adjacent to the first end portion 126 has the same ramped surfaces 170 provided at the opposite end of the hub 124. Thus, the end of the hub adjacent the first end portion 126 of the ferrule structure 122 nests within the attenuator housing 160 in the same manner previously described with respect to the opposite end of the hub.

Figure 1:
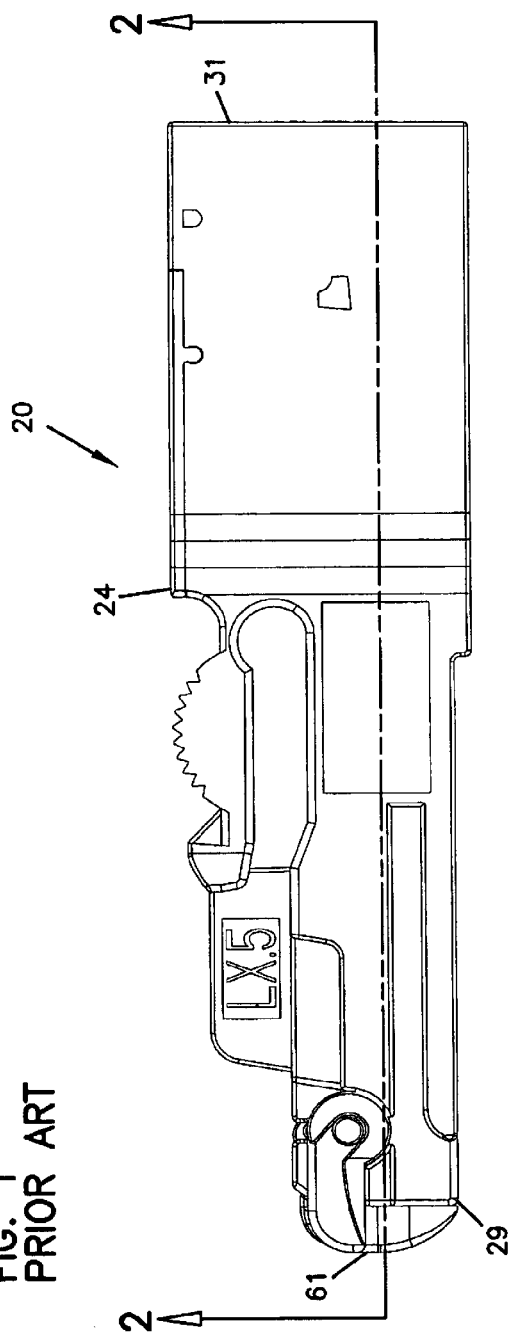
FIG. 1 schematically depicts a prior art in-line attenuator.
Figure 2:
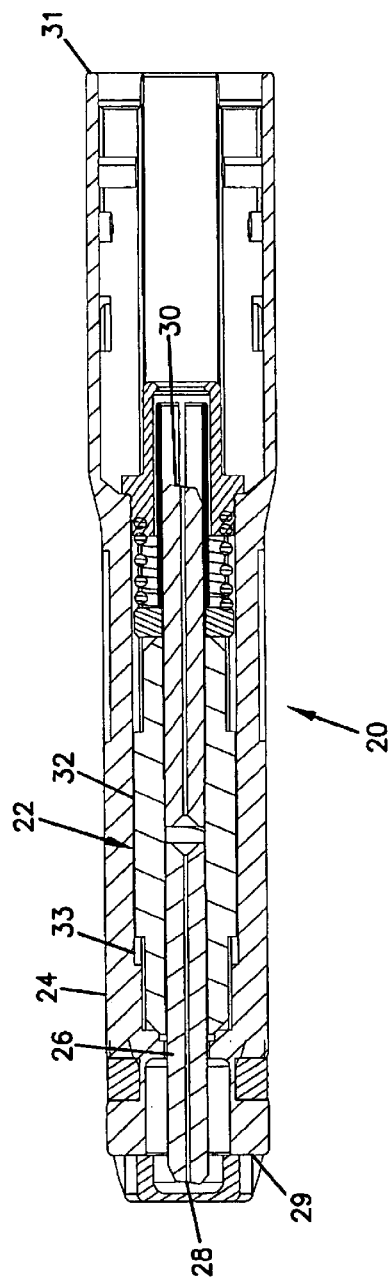
FIG. 2 is a cross-sectional view taken along section line 2—2 of FIG. 1.
Figure 16:
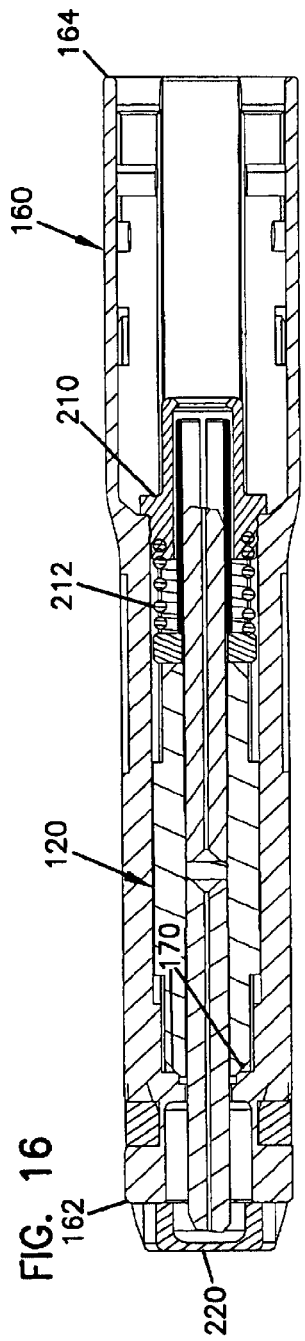
FIG. 16 shows the in-line attenuator after final assembly.

Once the end face 126a of the ferrule structure 122 has been polished, the housing 160 is again removed from the polishing fixture 180, and the connector 150 is removed from the first end 162 of the attenuator housing 160. The ferrule assembly 120 can then be final mounted within the housing 160. When the ferrule assembly 120 is final mounted within the housing 160, the ferrule assembly is not readily removable from the housing, and the assembly is essentially ready for use/sale as an in-line attenuator. FIG. 16 shows one example of how the ferrule assembly 120 can be final mounted within the housing 160. It will be appreciated that the configuration for holding the ferrule assembly within the housing is the same as the one depicted in the prior art arrangement of FIG. 2. As shown in FIG. 16, a retaining assembly 210 is mounted (e.g., by means such as a threaded, press fit or adhesive connection) at the second end 164 of the attenuator housing 160 to capture the ferrule assembly 120 within the housing 160. The retaining assembly 210 includes a spring 212 that biases the ferrule assembly against the ramp surfaces 170 of the housing 160. A pivoting cover 220 can also be mounted at the first end 162 of the housing 160.

Figure 18:
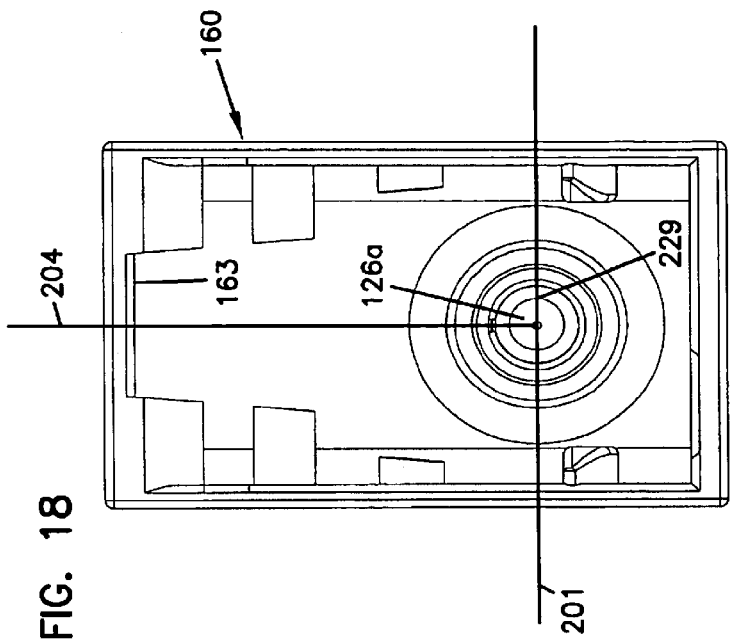
FIG. 18 is a right end view of the in-line attenuator of FIG. 16.
Figure 17:
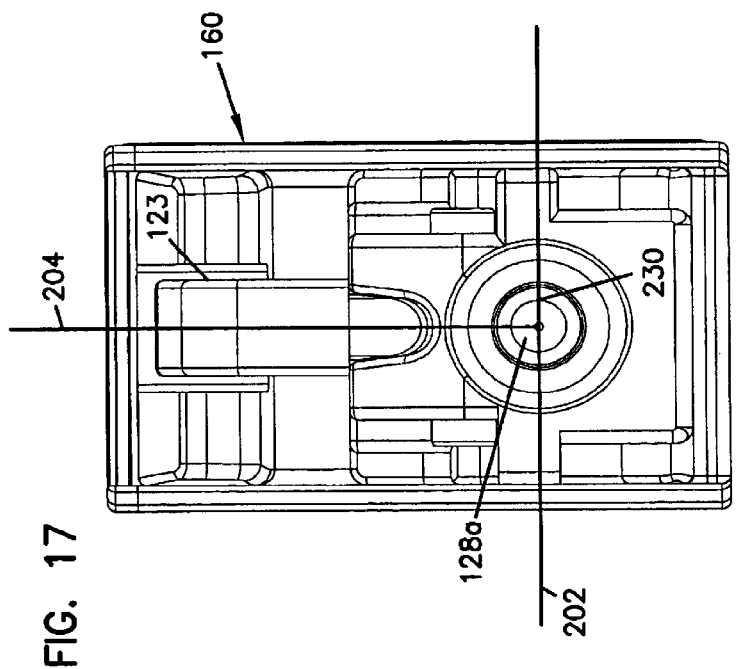
FIG. 17 is a left end view of the in-line attenuator of FIG. 16 with the end cap removed such that the ferrule end face is visible.

When the ferrule assembly 120 is mounted within the housing 160, rotational alignment of the angled end faces 126a, 128a and the keying structures of the attenuator housing 160 are ensured because both of the end faces 126a, 128a were polished while the ferrule assembly 120 was mounted within the housing 160. For example, the alignment of the attenuator housing 160 within the polishing fixture 180 ensures that major axes 201, 202 (shown in FIGS. 17 and 18) of the elliptical end faces 126a, 128a are aligned perpendicular relative to a reference plane 204 that bisects the alignment key 123 and the alignment keyway 163 of the attenuator housing 160. In the depicted embodiment, outermost apexes 229, 230 of the end faces 126a, 128a are aligned at a 3 o'clock position relative to the key 123 and keyway 163, respectively. Thus, the end faces 126a, 128a are adapted to make gap-free connections with connector ferrules that are similarly oriented in the 3 o'clock position. It will be appreciated that the orientation of the angled end faces can be varied to correspond to connectors having angled end faces oriented in different rotational positions.

It is preferred for the attenuator housing 160 used during the polishing process to be the actual attenuator housing in which the ferrule/hub assembly 120 is ultimately mounted to manufacture a finalized in-line attenuator. However, in certain embodiments, a housing that replicates the actual end use housing may be used.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for polishing a ferrule structure including first and second ends respectively having first and second end faces, the method comprising:

positioning the ferrule structure within a housing such that the first end projects beyond the housing;

polishing the first end face while the ferrule structure is positioned within the housing and the first end projects beyond the housing;

reversing a position of the ferrule structure within the housing such that the second end projects beyond the housing; and polishing the second end face while the ferrule structure is positioned within the housing and the second end projects beyond the housing.

2. The method of claim 1, wherein the ferrule structure defines a longitudinal axis, and wherein the first and second end faces are polished at angles relative to planes perpendicular to the longitudinal axis.

3. The method of claim 2, wherein the first and second end faces are polished at 8 degree angles.

4. The method of claim 1, wherein the first and second end faces are polished while the housing is inserted within a polishing fixture.

5. The method of claim 4, wherein the polishing fixture and the housing have keying structures for ensuring that the housing is inserted at a desired rotational orientation relative to the polishing fixture.

6. The method of claim 5, wherein the housing is skewed within the polishing fixture.

7. The method of claim 1, wherein the housing and the ferrule structure include rotational alignment structures that ensure the ferrule structure is inserted in the same rotational orientation each time the ferrule structure is positioned within the housing.

8. The method of claim 7, wherein the rotational alignment structures include a hub mounted on the ferrule structure and a set of ramped housing surfaces defined within the housing, the hub including a first set of ramped hub surfaces that face toward the first end of the ferrule structure and a second set of ramped hub surfaces that face toward the second end of the ferrule structure.

9. The method of claim 8, wherein when the first end of the ferrule structure projects from the housing, the first set of ramped hub surfaces engage the set of ramped housing surfaces, and when the second end of the ferrule structure projects from the housing, the second set of ramped hub surfaces engage the set of ramped housing surfaces.

10. The method of claim 1, further comprising applying a spring bias to the ferrule structure as the first and second end faces are polished.

11. The method of claim 10, wherein the spring bias is provided by a fiber optic connector that connects to the housing, the fiber optic connector having a connector ferrule that engages the second end face of the ferrule structure when the first end face is being polished, and that engages the first end face of the ferrule structure when the second end face is being polished.

12. The method of claim 11, further comprising using a split sleeve to couple the second end of the ferrule structure to the connector ferrule when the first end face is being polished, and using the split sleeve to couple the first end of the ferrule structure to the connector ferrule when the second end face is being polished.

13. A method for polishing a ferrule structure for an in-line attenuator, the ferrule structure including a first end having a first end face and a second end having a second end face, the method comprising:

providing an in-line attenuator housing including a first end positioned opposite from a second end, the first end including a rotational alignment key and the second end defining a receptacle including a rotational alignment keyway;

inserting the ferrule structure within the housing such that the first end of the ferrule structure is accessible for polishing at the first end of the housing;

polishing the first end face while the ferrule structure is inserted within the housing;

reversing the ferrule structure within the housing such that the second end of the ferrule structure is accessible for polishing at the first end of the housing; and polishing the second end face while the ferrule structure is positioned within the housing.

14. The method of claim 13, wherein the first and second end faces are polished at angles.

15. The method of claim 13, wherein the first and second end faces are polished while the housing is inserted within a polishing fixture.

16. The method of claim 15, wherein the first end of the housing is inserted into an opening defined by the polishing fixture, and wherein the opening defines a keyway for receiving the key at the first end of the housing.

17. The method of claim 16, wherein the opening is skewed within the polishing fixture.

18. The method of claim 13, wherein the housing and the ferrule structure include rotational alignment structures that ensure the ferrule structure is inserted in the same rotational orientation each time the ferrule structure is positioned within the housing.

19. The method of claim 18, wherein the rotational alignment structures include a hub mounted on the ferrule structure and a set of ramped housing surfaces defined within the housing, the hub including a first set of ramped hub surfaces that face toward the first end of the ferrule structure and a second set of ramped hub surfaces that face toward the second end of the ferrule structure.

20. The method of claim 19, wherein when the first end face is polished the first set of ramped hub surfaces engage the set of ramped housing surfaces, and when the second end face is polished the second set of ramped hub surfaces engage the set of ramped housing surfaces.

21. The method of claim 13, further comprising applying a spring load to the ferrule structure as the first and second end faces are polished.

22. The method of claim 21, wherein the spring load is provided by a fiber optic connector inserted within the receptacle at the second end of the housing, the fiber optic connector having a connector ferrule that engages the second end face when the first end face is being polished, and that engages the first end face when the second end face is being polished.

23. The method of claim 22, further comprising using a split sleeve to couple the second end of the ferrule structure to the connector ferrule when the first end face is being polished, and using the split sleeve to couple the first end of the ferrule structure to the connector ferrule when the second end face is being polished.

* * * * *